United States Patent
Kim

(10) Patent No.: US 7,746,871 B2
(45) Date of Patent: Jun. 29, 2010

(54) METHOD AND APPARATUS FOR COMMUNICATING DATA USING TX/RX FIFO STRUCTURE IN A WIDEBAND STEREO CODEC INTERFACE

(75) Inventor: Sung-Min Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 680 days.

(21) Appl. No.: 11/606,354

(22) Filed: Nov. 30, 2006

(65) Prior Publication Data

US 2007/0153786 A1 Jul. 5, 2007

(30) Foreign Application Priority Data

Nov. 30, 2005 (KR) ................... 10-2005-0116009

(51) Int. Cl.
 *H04L 12/28* (2006.01)
(52) U.S. Cl. .................... 370/395.7; 370/412
(58) Field of Classification Search ............... None
See application file for complete search history.

(56) References Cited

U.S. PATENT DOCUMENTS

| | | | |
|---|---|---|---|
| 6,179,489 B1* | 1/2001 | So et al. | 718/102 |
| 2004/0268009 A1* | 12/2004 | Shin et al. | 710/310 |
| 2005/0055116 A1* | 3/2005 | Isaka et al. | 700/94 |
| 2005/0135159 A1* | 6/2005 | Inoue et al. | 365/189.05 |

\* cited by examiner

*Primary Examiner*—Gregory B Sefcheck
*Assistant Examiner*—Nima Mahmoudzadeh
(74) *Attorney, Agent, or Firm*—Roylance, Abrams, Berdo & Goodman, L.L.P.

(57) ABSTRACT

A method and interface are provided for using a memory that distinguishes transmission data from reception data and performs a First-In-First-Out (FIFO) operation on the transmission and reception data in a communication system. In the method, a controller receives from a register a last transmission address provided for dividing one memory module having L addresses into a transmission area having M addresses according to application, where M is less than or equal to L, and a reception area having (L-M) addresses. A codec interface allocates a first address up to the last transmission address of the memory module for the transmission area. The codec interface allocates an address increased by 1 from the last transmission address up to the last address of the memory module for the reception area.

4 Claims, 6 Drawing Sheets

METHOD AND APPARATUS FOR COMMUNICATING DATA USING TX/RX FIFO STRUCTURE IN A WIDEBAND STEREO CODEC INTERFACE

CROSS-REFERENCE TO RELATED APPLICATIONS

This application claims the benefit under 35 U.S.C. §119 (a) of Korean Patent Application Serial No. 2005-116009 filed in the Korean Intellectual Property Office on Nov. 30, 2005, the entire contents of which are hereby incorporated by reference.

BACKGROUND OF THE INVENTION

1. Field of the Invention

The present invention relates generally to a communication system. In particular, the present invention relates to a method and apparatus for communicating transmission/reception data of a codec interface that processes voice and audio information in a mobile communication chip.

2. Description of the Related Art

Generally, a wideband stereo codec includes an analog-to-digital converter (ADC) for converting voice and audio information, that is an analog signal, received at a reception apparatus (for example, terminal) in a mobile communication system, into a digital signal, and a digital-to-analog converter (DAC) for converting a digital signal into an analog signal to output voice and audio signal. The wideband stereo codec further includes an apparatus for performing coding/decoding on the voice and audio information.

The wideband stereo codec is connected to a codec interface, and exchanges transmission/reception data with other hardware blocks prepared in the reception apparatus. The codec interface includes a transmission First-In-First-Out (FIFO) memory for storing transmission data and a reception FIFO memory for storing received data, and exchanges data associated with voice and audio information with the wideband stereo codec.

In this context, FIG. 1 is a diagram illustrating a conventional FIFO structure that includes capacity-fixed transmission FIFO memory and reception FIFO memory and exchanges data with a wideband stereo codec connected thereto.

Referring to FIG. 1, the FIFO structure of the conventional codec interface 130 separately uses a transmission FIFO memory 135 and a reception FIFO memory 140. The codec interface 130 performs interfacing with a wideband stereo codec 115 via the transmission FIFO memory 135 and the reception FIFO memory 140 having a predetermined size. That is, the transmission FIFO memory 135 and the reception FIFO memory 140 are separated from each other by hardware. In Application Specific Integrated Circuit (ASIC) design, the transmission FIFO memory 135 and the reception FIFO memory 140 perform an interfacing operation using predetermined memory capacity.

In other words, the codec interface 130 adopts a scheme of controlling flow of transmission data using the transmission FIFO memory 135, and controlling flow of reception data using the reception FIFO memory 140. A description will now be made of a procedure for exchanging voice and audio information between the wideband stereo codec 115 and the codec interface 130.

In a voice and audio information transmission process, generated voice and audio information is input to the transmission FIFO memory 135 in the codec interface 130 via a bus 145 which is an information delivery path between peripheral hardware chips. The transmission FIFO memory 135 sequentially stores the sequentially received voice and audio information. The voice and audio information stored in the transmission FIFO memory 135 is sequentially delivered to the wideband stereo codec 115, and converted into an analog voice and audio signal by a DAC 120. Thereafter, the analog voice and audio signal is output over the air via a speaker 105.

In a voice and audio information reception process, an analog signal input via a microphone 110 is converted into digital data by an ADC 125 in the wideband stereo codec 115. The reception FIFO memory 140 in the codec interface 130 sequentially stores the sequentially received digital data. The digital voice and audio information is delivered to other hardware devices via the bus 145.

As described above, the conventional codec interface 130 has a fixed size, and transmits/receives voice and audio information using the transmission FIFO memory 135 and the reception FIFO memory 140, which are separated by hardware. That is, the codec interface 130 includes at least two FIFO memories of the transmission FIFO memory 135 and the reception FIFO memory 140. Therefore, the conventional mobile communication chip needs at least two Dual-Port Random Access Memories (DPRAMs).

Generally, in a semiconductor process, as the number of memories increases, a Design For Test (DFT) logic increases in size. This means an increase in layout and wiring efforts. Therefore, the need for the two separate DPRAMs causes unnecessary processing delay.

In addition, because the conventional codec interface unconditionally separately uses the transmission FIFO memory with predetermined capacity and the reception FIFO memory with predetermined capacity, it has a predetermined size in terms of hardware.

However, because the conventional codec interface has only the transmission FIFO memory or reception FIFO memory with predetermined capacity, when there is a large amount of voice and audio information, the transmission FIFO memory stores the information as much as the predetermined capacity and then must waits for memory to become available in order to continue processing.

SUMMARY OF THE INVENTION

An aspect of exemplary embodiments of the present invention is to address at least the above problems and/or disadvantages and to provide at least the advantages described below. Accordingly, an aspect of certain exemplary embodiments of the present invention is to provide a method and apparatus for implementing a transmission/reception FIFO in a wideband stereo codec interface, with a single size-variable FIFO.

Another aspect of certain exemplary embodiments of the present invention is to provide a method and apparatus for integrating the capacity-fixed, separated transmission/reception FIFO in a wideband stereo codec interface, and implementing an adjustable variable-length FIFO structure, thereby more efficiently utilizing the FIFO according to application.

According to one aspect of certain exemplary embodiments of the present invention, there is provided a wideband stereo codec interface for transmitting/receiving data using a transmission/reception First-In-First-Out (FIFO) memory. The wideband stereo codec interface includes a first interface logic for exchanging voice and audio data with a wideband stereo codec, and generating an address and control signal generated for transmission, an address and control signal generated for reception, and a write data signal. The wideband stereo codec interface according to exemplary embodiments of the present invention also includes a multiplexer for alternately outputting the transmission/reception signals delivered from the first interface logic according to a previously input toggle signal, a transmission/reception FIFO memory including a transmission area and a reception area distinguishable according to a preset last transmission address, the transmission/reception FIFO memory performing a read/write operation on each of the transmission and reception areas according to the transmission/reception signal output from the multiplexer, delivering transmission read data to the first interface logic, and outputting received read data, and a second interface logic for receiving the read data delivered from the transmission/reception FIFO memory, delivering the received read data to a central processing unit (CPU) via a bus, and delivering as write data the data delivered from the CPU via the bus to the transmission/reception FIFO memory along with corresponding control signal and address signal. Each of the first and second interface logics may include control registers that store parameters indicating the number of data units for the case where the transmission/reception area is almost full or empty, and if read data input to each of the first and second interface logics arrives at the stored parameter value, each of the first and second interface logics generates an interrupt signal according to each parameter value and outputs the interrupt signal to the CPU.

According to another aspect of certain exemplary embodiments of the present invention, there is provided a method for transmitting/receiving data using a transmission/reception First-In-First-Out (FIFO) memory in a wideband stereo codec interface. According to an exemplary implementation, if a signal input with one memory is transmission data, the transmission data from an address 0 of the memory up to a preset last transmission address, and the data back from the address 0 after the last transmission address are stored. The transmission data is output in the stored order of addresses for the transmission data. If the input signal is received data, the received data from the last address of the memory up to the last transmission address +1, and the data back from the last address after the last transmission address +1 are stored. The received data is output as read data in the stored order of addresses for the received data.

BRIEF DESCRIPTION OF THE DRAWINGS

The above and other objects, features and advantages of certain exemplary embodiments of the present invention will become more apparent from the following detailed description when taken in conjunction with the accompanying drawings in which.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

Exemplary embodiments of the present invention provide a scheme for variably using a memory area according to the amount of transmission information and the amount of reception information in transmitting/receiving voice and audio information in a communication system. In exemplary implementation, illustrative embodiments of the present invention provide a scheme for more efficiently using a FIFO memory by processing transmission/reception data in a mobile communication system that performs communication using a wideband stereo codec.

According to an exemplary embodiment of the present invention, a codec interface connected to the wideband stereo codec includes one FIFO module and performs a read/write operation on transmission data and received data. In an exemplary implementation, a transmission memory area and a reception memory area in the FIFO module can be variably adjusted according to the characteristic and amount of the generated data.

Exemplary embodiments of the present invention will be described herein with reference to a FIFO in a wideband stereo codec interface in a mobile terminal. However, exemplary embodiments of the present invention can be applied to various multimedia input/output devices where input data and output data are simultaneously generated, such as, for example, a computer that uses a FIFO memory for inputting/outputting sound or moving image data in a communication system.

Figure 1:
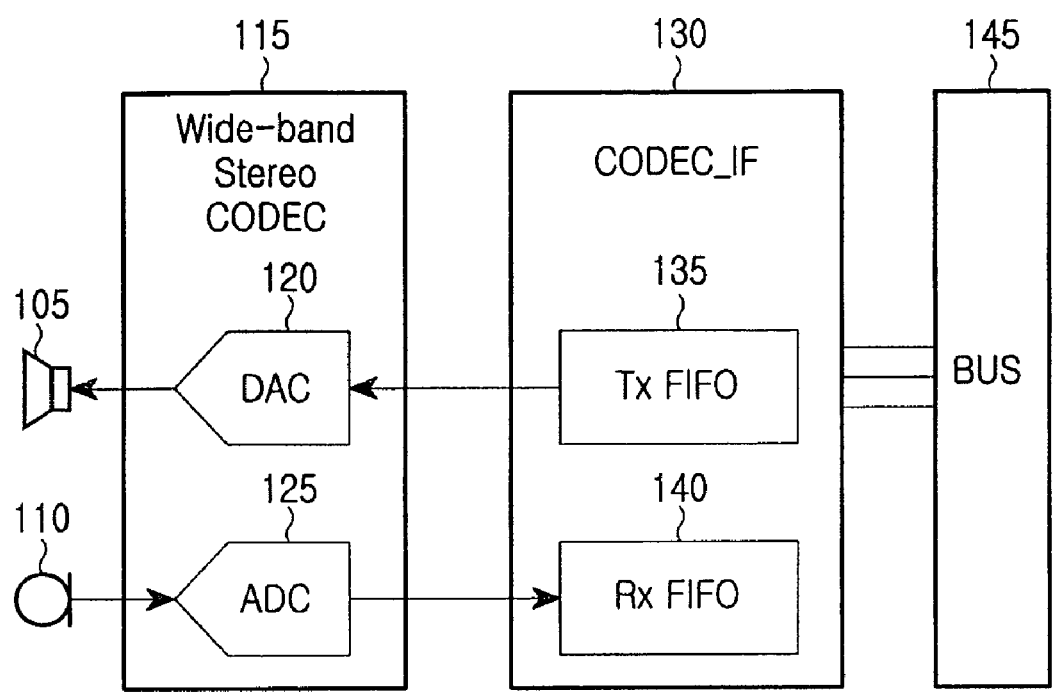
FIG. 1 is a diagram illustrating a conventional FIFO structure that includes separate capacity-fixed transmission FIFO memory and reception FIFO memory.
Figure 2:
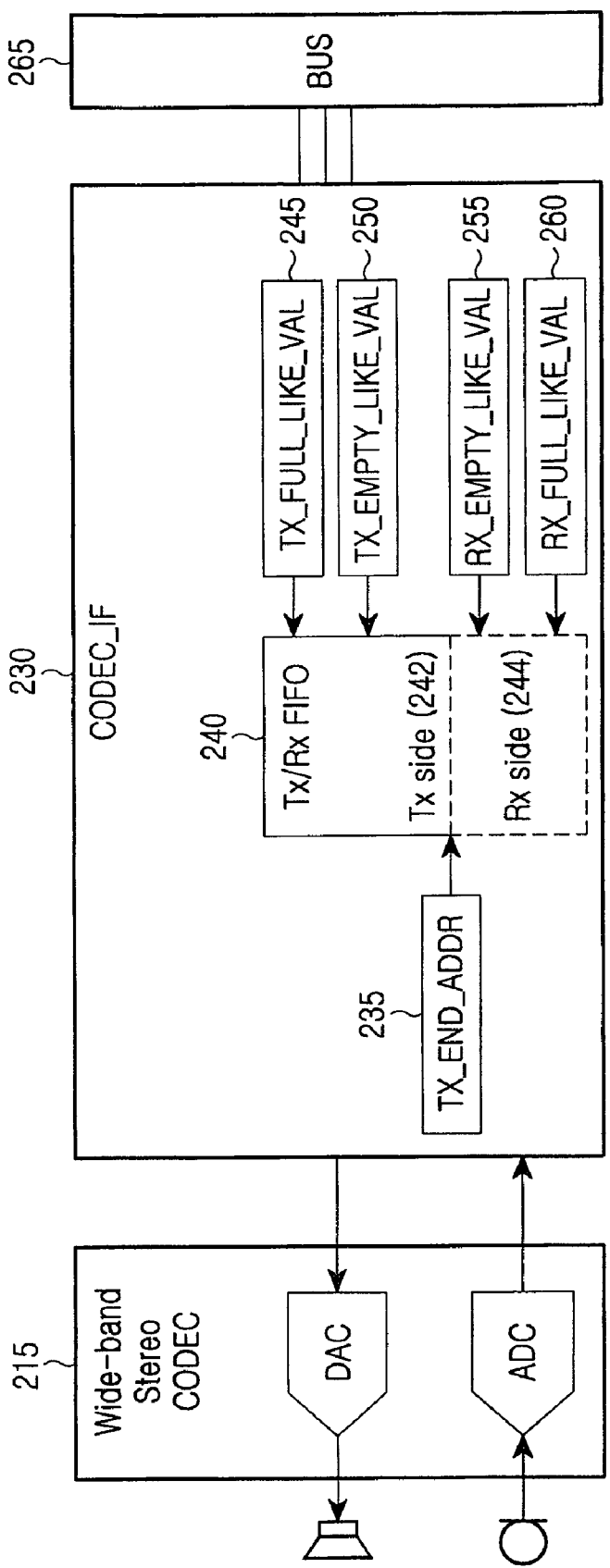
FIG. 2 is a diagram illustrating a structure of a codec interface that variably distinguishes a transmission memory area and a reception memory area according to an exemplary embodiment of the present invention.

FIG. 2 is a diagram illustrating a structure of a codec interface that variably distinguishes a transmission memory area and a reception memory area according to an exemplary embodiment of the present invention.

Referring to FIG. 2, a codec interface 230 includes a transmission memory area and a reception memory area, which coexist in one FIFO module 240. The codec interface 230 performs interfacing with a wideband stereo codec 215, and the digital voice and audio information is delivered to other hardware devices via the bus 265.

The FIFO module 240 receives last transmission address TX_END_ADDR information which is set as a variable value according to application, from a register 235 that stores the last transmission address TX_END_ADDR information. The FIFO module 240 in the codec interface 230 separately uses a transmission (Tx) FIFO area 242 and an reception (Rx) FIFO area 244 using the last transmission address TX_END_ADDR information. The FIFO module 240 can be implemented with a random access memory (RAM).

For example, addresses of a $0^{th}$ address to TX_END_ADDR 235 of the FIFO module 240 are used for the Tx FIFO area 242, and addresses of TX_END_ADDR+1 to the last address of the FIFO module 240 are used for the Rx FIFO area 244.

For example, the TX_END_ADDR 235 is variably set according to the amount of transmission/reception information corresponding to an application to be executed. Therefore, it may be possible to set more transmission addresses, or set more reception addresses.

For example, for the case where MP3 Player application is executed, it can be generally considered that no call is generated from the outside. Therefore, if there is no received data, the total area of the FIFO module 240 is set for the Tx FIFO area 242. That is, the last transmission address TX_END_ADDR value is set as the last address of the FIFO 240.

According to an exemplary implementation of an embodiment of the present invention, FIFO structure is implemented by internally dividing one RAM into two areas, where one of the factors is a value of the TX_END_ADDR 235.

In an exemplary implementation, the FIFO memory has no need to consider addresses in a process of writing or reading data into/from RAM, the addresses should be made in terms of hardware. A method for making the addresses according to an embodiment of the present invention uses a circular addressing scheme, and the TX_END_ADDR value 235 provides an address switching point corresponding to the transmission area or the reception area.

For example, if a transmission address pointer currently points the TX_END_ADDR 235, the input transmission data should be stored in back from the address 0, instead of being stored in the address TX_END_ADDR+1. This is determined by an address generation logic using a value of the TX_END_ADDR register 235, and the address generation logic starts circularly storing data from the address 0. The reception addresses store received data from the last RAM address RAM_END_ADDR up to the address TX_END_ADDR+1, and the circularly-reduced address used for storing the next received data is RAM_END_ADDR.

In addition, the codec interface 230 further includes registers of a TX_FULL_LIKE_VAL 245, a TX_EMTPY_LIKE_VAL 250, an RX_FULL_LIKE_VAL 260, and an RX_EMPTY_LIKE_VAL 255 for generating a full/empty indication signal indicating Full/Empty for transmission and a full/empty indication signal indicating Full/Empty for reception in association with data flow control in FIFO operation. The registers 245, 250, 255 and 260 each store a parameter value indicating the number of data units for the case where the transmission area is full or empty, or store a parameter value indicating the number of data units for the case where the reception area is full or empty. In an exemplary implementation, the registers may be stored in one register.

When the area approaches the value, the codec interface 230 can generate an interrupt, and the generated interrupts are delivered to a central processing unit (CPU).

Figure 3:
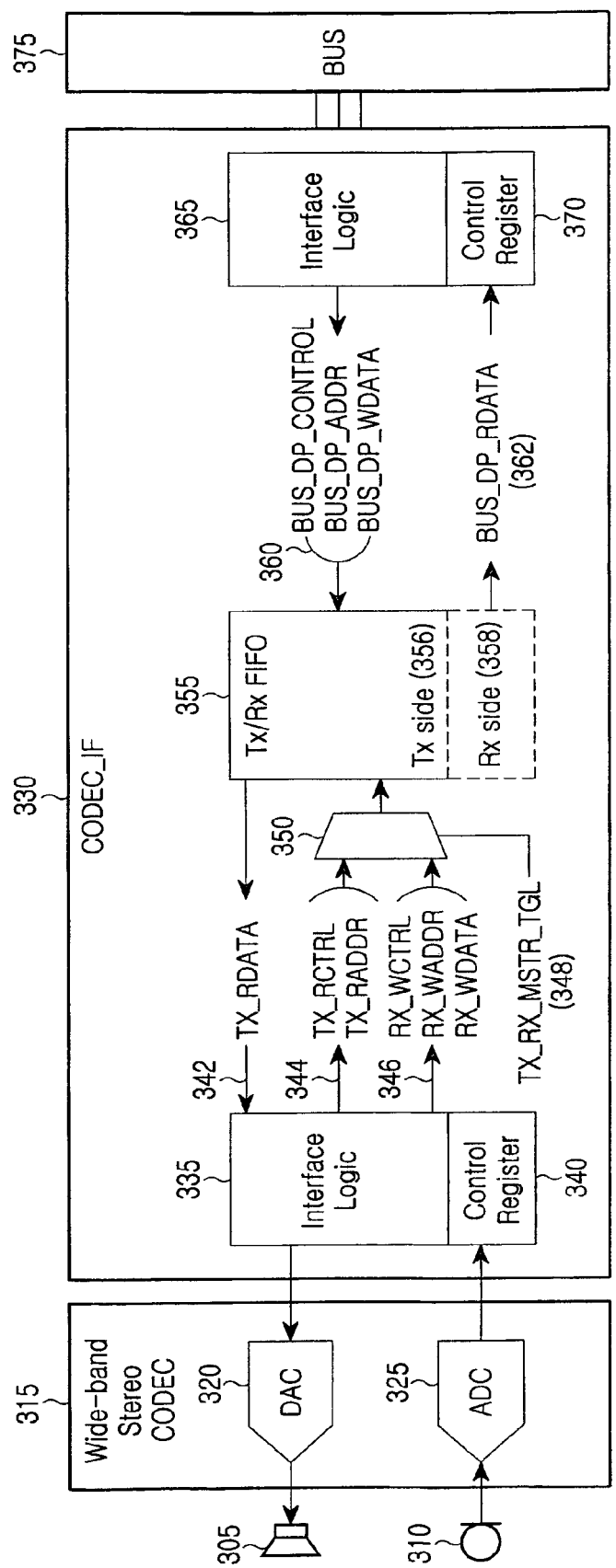
FIG. 3 is a diagram illustrating a control operation for distinguishing a transmission area and a reception area in a codec interface according to an exemplary embodiment of the present invention.

FIG. 3 is a diagram illustrating a control operation for distinguishing a transmission area and a reception area in a codec interface according to an exemplary embodiment of the present invention.

Referring to FIG. 3, a codec interface 330 includes one FIFO module 355 and performs an operation of transmitting or receiving data. In order to operate as a transmission/reception memory in the FIFO module 355, the codec interface 330 is composed of interface logics 335 and 365 and control registers 340 and 370, including an address generation logic.

The interface logic 335 is a block for data exchange and signaling exchange with a wideband stereo codec 315. The interface logic 365 is a block for data exchange and signaling exchange with a bus 375. The interface logics 335 and 365 can be implemented with one unit, or can be implemented with separated hardware blocks.

The control registers 340 and 370 store the values used for determining whether transmission/reception addresses of the FIFO module 355 are full or empty. The codec interface 330 can generate an interrupt signal using the above values. The generated interrupt signal is delivered to the CPU where it is used for controlling transmission/reception of the data.

A description will now be made of a procedure for transmitting/receiving voice and audio signals using the codec interface 330 including the interface logics 335 and 365 and the control registers 340 and 370.

In a voice and audio data transmission process, the interface logic 365 receives voice and audio data from the bus 375, and delivers a logic signal 360 to the FIFO module 355. The logic signal 360 includes a bus dual-port memory control signal BUS_DP_CONTROL, a generated address signal BUS_DP_ADDR, and a write data signal BUS_DP_WDATA.

The FIFO module 355 performs an operation of sequentially writing data in a transmission area 356 using the logic signal 360. The FIFO module 355 sequentially delivers the data sequentially written in the transmission area 356 to the interface logic 335 using transmission read data (TX_RDATA) 342. The interface logic 335 delivers the sequentially written read data from the transmission area 356 of the FIFO module 355, to the wideband stereo codec 315. A DAC 320 of the wideband stereo codec 315 converts the digital voice and audio signal into an analog signal, and outputs the analog signal over the air via a speaker 305.

In a voice and audio data reception process, an analog signal input from a microphone 310 is converted into a digital signal by an ADC 325 of the wideband stereo codec 315, and then delivered to the interface logic 335.

The interface logic 335 provides write data to the FIFO module 355. For example, the interface logic 335 delivers the write data to the FIFO module 355 every time a transmission signal 344 and a reception signal 346 are sent to the FIFO module 355. For example, the transmission signal 344 includes a transmission area control signal TX_RCTRL and a transmission area read address signal TX_RADDR. The reception signal 346 includes a reception area write control signal RX_WCTRL, a reception area write address signal RX_WADDR, and a reception area write data signal RX_WDATA.

Because the transmission signal 344 and the reception signal 346 are simultaneously or irregularly delivered to the FIFO module 355, the interface logic 335 selectively outputs the signals to the FIFO module 355 via a switch or multiplexer 350. Therefore, the multiplexer 350 receives a (for example, preset) transmission/reception master toggle (TX_RX_MSTR_TGL) 348 to regularly transmit the transmission signal 344 and the reception signal 346. After the multiplexer 350 is controlled by the transmission/reception master toggle (TX_RX_MSTR_TGL) 348, the interface logic 335 performs an operation of reading data from the FIFO module 355 and transmitting the read data according to the transmission signal 344, or an operation of writing received data in the FIFO module 355 according to the reception signal 346.

If the reception signal 346 is delivered from the multiplexer 350, the FIFO 355 writes data in a reception area 358 of the FIFO module 355 using a write address included in the reception signal 346 and the wire data. Thereafter, the FIFO module 355 delivers a bus dual port memory read data (BUS_DP_RDATA) signal output from the reception area 358 to the interface logic 365. Finally, the interface logic 365 reads received delivers the received data to other hardware blocks via the bus 375.

The control registers 340 and 370 store such boundary values as the TX_FULL_LIKE_VAL 245, the TX_EMPTY_LIKE_VAL 250, the RX_FULL_LIKE_VAL 260, and the RX_EMPTY_LIKE_VAL 255 described in FIG. 2. Therefore, the control registers 340 and 370 compare the register values used for determining whether the transmission area 356 or the reception area 358 is full or empty, with the read address values in the signals RDATA received at the interface logics 335 and 365. The comparison results are generated as interrupt signals.

In response to the generated interrupt signal, the CPU can adjust the amount of data transmitted to the transmission area 356. Further, in response to the interrupt signal, the CPU can adjust the amount of data applied to the reception area 358. That is, the generated interrupt signal is provided to the main CPU (not shown) so that it controls flow of transmission/reception data of the FIFO module 355.

Figure 4:
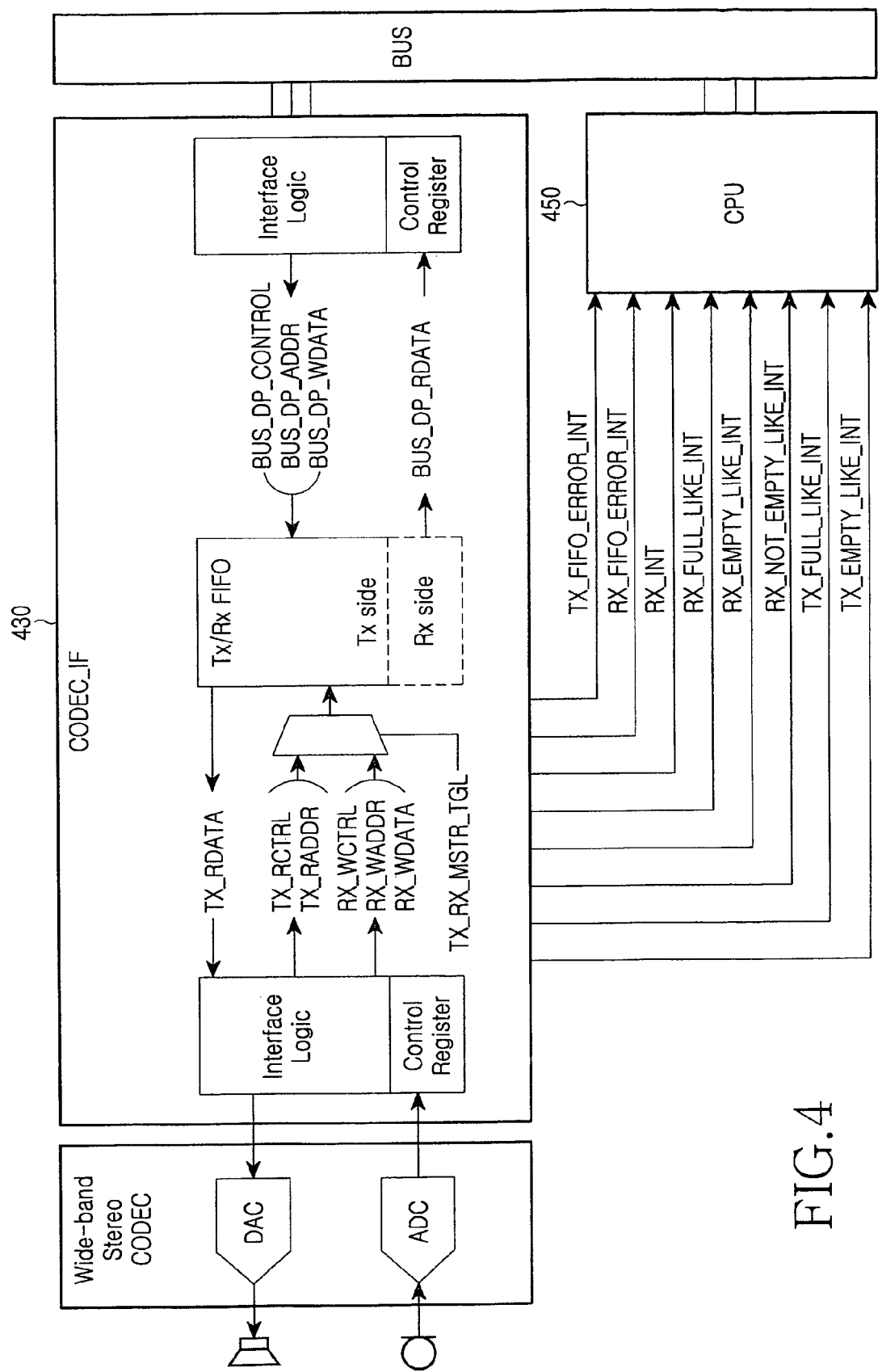
FIG. 4 is a diagram illustrating generation of an interrupt in a codec interface according to an exemplary embodiment of the present invention.

FIG. 4 is a diagram illustrating generation of an interrupt in a codec interface according to an exemplary embodiment of the present invention.

Referring to FIG. 4, a codec interface 430 can generate various interrupt signals as it performs a transmission/reception operation for one FIFO module. The generated interrupt signal is delivered to a CPU 450.

For example, the interrupt signals include a transmission area FIFO error interrupt (TX_FIFO_ERROR_INT), a reception area FIFO error interrupt (RX_FIFO_ERROR_INT), a reception error interrupt (RX_INT), a reception area FULL possibility interrupt (RX_FULL_LIKE_INT), a reception area EMPTY possibility interrupt (RX_EMPTY_LIKE_INT), a reception NOT_EMPTY interrupt (RX_NOT_EMPTY_LIKE_INT), a transmission FULL possibility interrupt (TX_FULL_LIKE_INT), and a transmission EMPTY possibility interrupt (TX_EMPTY_LIKE_INT).

In addition, such interrupts as the reception area EMPTY possibility interrupt (RX_EMPTY_LIKE_INT), the reception NOT_EMPTY interrupt (RX_NOT_EMPTY_LIKE_INT), the transmission FULL possibility interrupt (TX_FULL_LIKE_INT), and the transmission EMPTY possibility interrupt (TX_EMPTY_LIKEINT) can be previously announced before Full/Empty occurs in order to compensate for interrupt processing delay of the CPU 450. In an exemplary implementation, the codec interface 430 previously reports to the CPU 450 the urgent state in which the transmission area or the reception area of the FIFO module is close to the Full/Empty condition.

For example, when there is a processing delay for the interrupt signal generated in the CPU 450, there is a possibility that wrong transmission data will be output or received data will be lost. Therefore, the codec interface 430 reports the interrupt signals related to the above stated possibility, thereby facilitating prevention of the possible problems.

Figure 5:
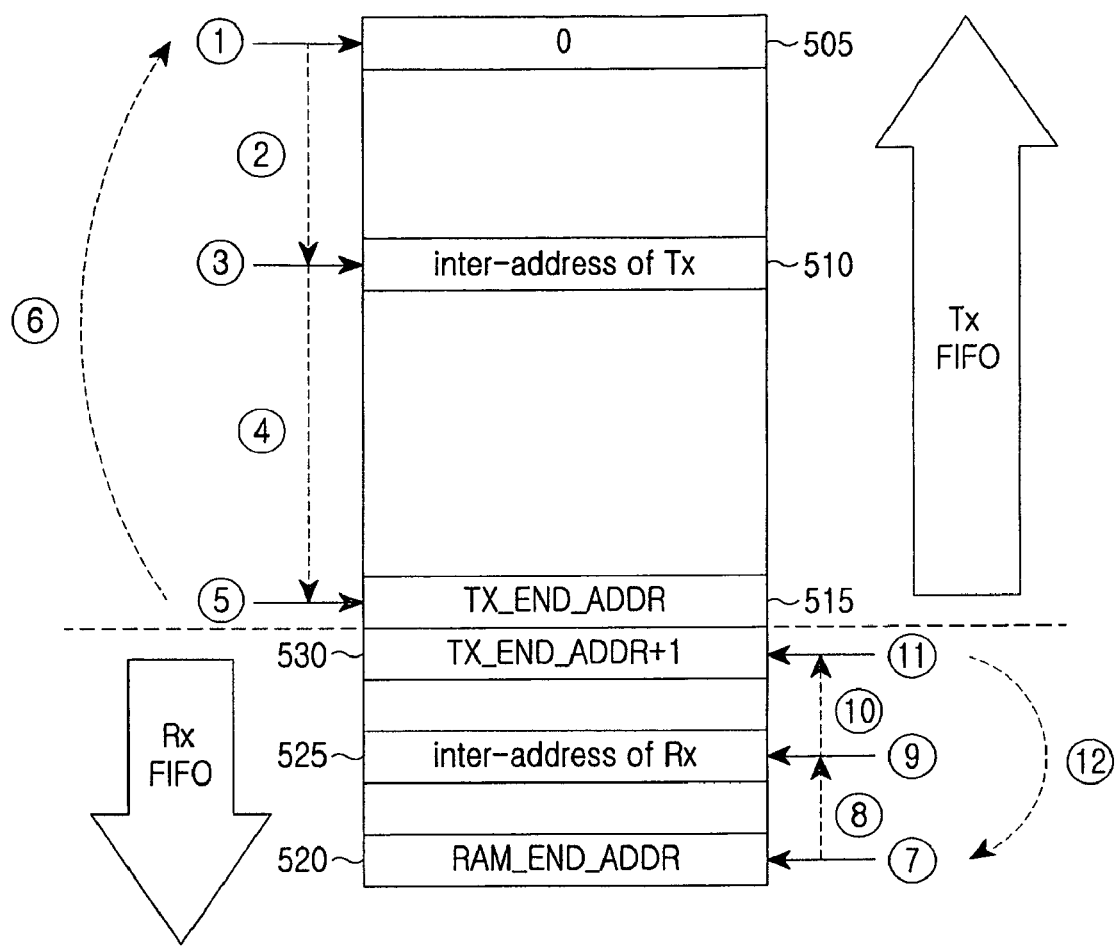
FIG. 5 is a diagram illustrating an operation of allocating transmission addresses and reception addresses in a FIFO module according to an exemplary embodiment of the present invention.

FIG. 5 is a diagram illustrating an operation of allocating transmission addresses and reception addresses in a FIFO module according to an exemplary embodiment of the present invention.

Referring to FIG. 5, transmission addresses and reception addresses are distinguished according to a value of TX_END_ADDR 515, for address allocation. For example, one FIFO module distinguishes a transmission area and a reception area using the value of the TX_END_ADDR 515, for address allocation.

According to an exemplary embodiment of the present invention, the transmission area corresponds to from an address_0 505 to the TX_END_ADDR 515 through an inter-address-of-Tx 510 indicating a current data transmission time.

The reception area corresponds to from the last address (RAM_END_ADDR) 520 determined according to a memory size of the FIFO module, up to TX_END_ADDR+1 530 through an inter-address-of-Rx 525 indicating a current data reception time. That is, the reception area is allocated addresses from the increased-by-1 address TX_END_ADDR+1 530 to the last address RAM_END_ADDR 520 corresponding to the size of the FIFO module, with the TX_END_ADDR 515 being used as a boundary value.

The CPU controls an operation of allocating one address to the FIFO module and performing a read/write operation for transmission or reception. According to an exemplary implementation, the CPU herein performs an operation of reading/writing transmission data at the same address.

For example, if the CPU allocates an address of the FIFO module at an address 0×1000, the CPU will write data in the address 0×1000. In response, a codec interface sets the address 0×1000 as a start address of the FIFO module, and sets a start address of the transmission area on the basis of the address 0×1000. The codec interface writes transmission data while sequentially increasing address one by one from the start address. Such address allocation of the codec interface contributes to a reduction in CPU load due to the operation in which the CPU writes data while allocating addresses. Therefore, the CPU can be efficiently used by using the CPU for other hardware blocks, or by preventing a delay due to the address allocation of the CPU.

In addition, the codec interface can sequentially output the transmission data sequentially written from the address 0×1000 of the FIFO module.

According to an exemplary embodiment of the present invention, a process of transmitting voice and audio information is described with reference to FIGS. 3 and 5 as follows. When writing transmission data in an address 0×1000, the CPU starts writing data from an address_0 505 of a transmission FIFO area in Step 1, and performs the write operation while sequentially increasing the address number in Step 2. Thereafter, the CPU passes an inter-address-of-Tx 510 in Step 3, and sequentially performs a write operation in an address following the inter-address-of-Tx 510 in Step 4. If the CPU arrives at TX_END_ADDR 515 indicating end of the transmission address in Step 5, the CPU proceeds to Step 6 where it performs a write operation back from the address_0 505 according to the circular addressing scheme.

When the interface logic 335 in communication with the wideband stereo codec 315 performs an operation of reading transmission data, the interface logic 335 performs a data read operation from the address_0 505 of the transmission FIFO area in Step 1. Here, the data read operation cannot be performed at an address preceding the address where the transmission data writing operation is performed. That is, the CPU passes the inter-where address-of-Tx 510, and sequentially performs a read operation after a write operation is performed in the address following the inter-address-of-Tx 510. Thereafter, if the data read operation is performed up to TX_END_ADDR 515, the CPU performs the read operation back from the address_0 505.

According to an exemplary embodiment of the present invention, a process of receiving voice and audio information is described with reference to FIGS. 3 and 5 as follows. When the interface logic 335 in communication with the wideband stereo codec 315 performs an operation of writing received data, the interface logic 335 starts writing the received data from the last address 520 of the reception FIFO area, corresponding to a size of the FIFO module, in Step 7. In Step 8, the interface logic 335 in communication with the wideband stereo codec 315 performs the write operation while sequentially decreasing an address number of the FIFO module. Thereafter, the interface logic 335 passes the inter-address-of-Rx 525 in Step 9, and sequentially performs the write operation in the address following the inter-address-of-Rx 525 in Step 10. If the interface logic 335 arrives at TX_END ADDR+1 530 indicating the last address of the reception area in Step 11, the interface logic 335 proceeds to Step 12 where it performs the write operation back from the last address_0 520 of the FIFO module according to the circular addressing scheme.

When the CPU performs an operation of reading received data, the CPU starts reading data from the last address 520 of the reception FIFO area, corresponding to the size of the FIFO module, in Step 7. The CPU performs the read operation while sequentially reducing the address number of the FIFO module in Step 8. Thereafter, the CPU passes the inter-address-of-Rx 525 in Step 9, and sequentially performs the read operation in the address following the inter-address-of-Rx 525 in Step 10. If the CPU arrives at the TX_END_ADDR+1 530 indicative of the last address of the reception area in Step 11, the CPU proceeds to Step 12 where it performs the read operation back from the last address_0 520 of the FIFO module according to the circular addressing scheme.

That is, according to the FIFO operation, the CPU sequentially reads the received data that was sequentially written from the address RAM_END_ADDR 520 of the reception area, and finally delivers the received data to other hardware blocks.

In an exemplary implementation, write and read operations of the transmission data and the received data can be simultaneously performed. The codec interface, although it includes one FIFO module, distinguishes the transmission area and the reception area using the values of the preset registers according to the present invention. In each of the memory areas, the write operation and the read operation are performed on a FIFO basis, and a FIFO operation of the transmission data and a FIFO operation of the received data can be simultaneously implemented.

In an exemplary implementation, the CPU notifies only the start address of the FIFO module, thereby performing transmission data writing and received data reading for the same start address. The codec interface distinguishes the transmission area from the reception area on the bases of the start address and the TX_END_ADDR 515, and increases/decreases addresses allocated to each of the memory areas.

Figure 6:
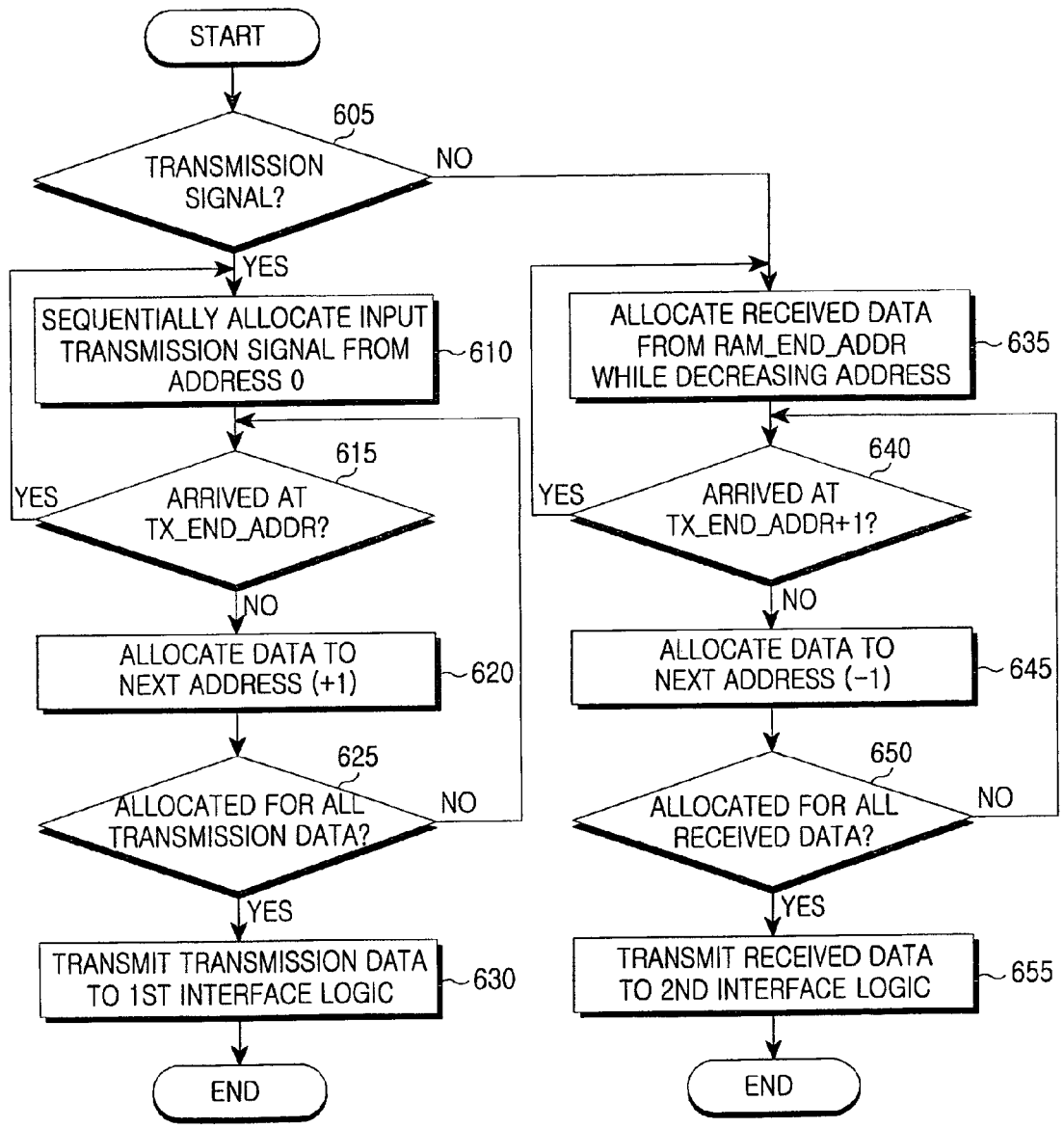
FIG. 6 is a flowchart illustrating a transmission/reception addressing operation in a reconfigurable transmission/reception FIFO according to an exemplary embodiment of the present invention.

FIG. 6 is a flowchart illustrating a transmission/reception addressing operation in a reconfigurable transmission/reception FIFO according to an exemplary embodiment of the present invention.

Referring to FIG. 6, a codec register divides one FIFO into a transmission area and a reception area using TX_END_ADDR indicating the last transmission address from a register. The TX_END_ADDR is set with a variable value according to implemented application. In an exemplary implementation, the transmission area and the reception area of the FIFO have the same size according to application. Alternatively, the FIFO can be implemented as either one of the transmission area or the reception area. The transmission area, compared with the reception area, can have a larger size (that is, having more addresses) according to application.

In step 605, the codec interface determines whether an input signal is a transmission signal to be output via a speaker or a received signal input via a microphone. For example, the codec interface determines whether the signal that its interface logic has received is a signal to be transmitted. If it is determined that the input signal is a transmission signal, the codec interface proceeds to step 610.

In step 610, the codec interface sequentially allocates the input transmission data from an address 0. After the sequential address allocation, if the codec interface arrives at the last transmission address TX_END_ADDR in step 615, the codec interface returns to step 610 and sequentially performs addressing back from the address 0. However, if the transmission data is not allocated up to the last transmission address, the codec interface proceeds to step 620.

In step 620, the codec interface allocates transmission data while sequentially increasing an address (that is, monotone increasing by +1). If it is determined in step 625 that the addressing has been performed for all transmission data, the codec interface proceeds to step 630 where it transmits the transmission data to a first interface logic. However, if the addressing has not been performed for all transmission data, the codec interface proceeds to step 615.

If it is determined in step 605 that the input signal is a received signal, the codec interface proceeds to step 635 where it allocates the received data while decreasing the address in reverse order from the last address of the RAM, that is the last address of the FIFO. The codec interface allocates the received data to the address that increases by −1 from the last address. Thereafter, if the codec interface arrives at the 'last transmission address +1' in step 640, the codec interface returns to step 635 and allocates the received data by decreasing the address in reverse order back from the last address of the FIFO.

However, if the codec interface has not yet arrived at the 'last transmission address +1', the codec interface proceeds to step 645 where it continuously allocates the received data to the decreased-by-1 address. If it is determined in step 650 that all the received data has been allocated, the codec interface transmits the received data to a second interface logic in step 655. The interface logic delivers the received data to other hardware blocks. However, if it is determined in step 650 that all the received data has not been allocated, the codec interface returns to step 640 and performs the addressing until it completes the reception.

In an exemplary implementation, the write and read operations of the transmission data can be simultaneously performed. Also, the write and read operations of the received data can be simultaneously performed. In an exemplary implementation, the write and read operation means a process of reading and outputting the written data, and the write operation precedes the read operation.

As can be understood from the foregoing description, exemplary embodiments of the present invention variably adjusts a size of the Tx FIFO area and the Rx FIFO area, thus contributing to an increase in memory utilization efficiency. According to exemplary implementations of the present invention, both a transmission memory and a reception memory may be provided using one FIFO module, thereby reducing memory space of the chip.

In addition, exemplary embodiments of the present invention can integrate two RAMs into one chip, thereby reducing a size of the DFT logic and reducing layout attempt. As a result, it is possible to remove the processing delay factors.

In exemplary implementations of the present invention, the CPU can read/write transmission/reception data with one address, and the codec interface can reduce the CPU load because of its high memory efficiency. By doing so, may be possible to guarantee efficiency of the CPU.

While the invention has been shown and described with reference to a certain exemplary embodiment thereof, it will be understood by those skilled in the art that various changes in form and details may be made therein without departing from the spirit and scope of the invention as defined by the appended claims and their equivalents.

What is claimed is:

1. A wideband stereo codec interface for transmitting/receiving data using a transmission/reception First-In-First-Out (FIFO) memory, comprising:
   a first interface logic for exchanging at least one of voice and audio data with a wideband stereo codec, and generating an address and control signals for a transmission signal, an address and control signals for a reception signal, and a write data signal;
   a multiplexer for alternately outputting one of the transmission and reception signals delivered from the first interface logic according to a toggle signal;
   a transmission/reception FIFO memory comprising a transmission area and a reception area distinguishable according to a last transmission address, the transmission/reception FIFO memory performing a read/write operation on each of the transmission and reception areas according to the one of the transmission and reception signals output from the multiplexer, delivering transmission read data to the first interface logic, and outputting received read data; and
   a second interface logic for receiving the read data delivered from the transmission/reception FIFO memory, delivering the received read data to a central processing unit (CPU), and delivering as write data the data delivered from the CPU and a corresponding control and address signals to the transmission/reception FIFO memory;
   wherein each of the first and second interface logics comprises control registers that store parameters indicating the number of data units for the case where at least one of the transmission and reception areas is substantially full or empty, and if read data input to each of the first and second interface logics arrives at the stored parameter value, each of the first and second interface logics generates an interrupt signal according to each parameter value and outputs the interrupt signal to the CPU.

2. The wideband stereo codec interface of claim 1, wherein the transmission/reception FIFO memory comprises:
   the transmission area for, if an input signal comprises transmission data, storing the transmission data from an address 0 of the transmission/reception FIFO memory up to the last transmission address, and storing the data back from the address 0 after the last transmission address; and
   the reception area for, if the input signal is received data, storing the received data from the last reception address of the transmission/reception FIFO memory up to the last transmission address +1, and storing the data back from the last reception address after the last transmission address +1.

3. The wideband stereo codec interface of claim 1, wherein the last transmission address is set according to an amount of transmission/reception data.

4. The wideband stereo codec interface of claim 1, wherein the received read data is delivered to a central processing unit (CPU) via a bus, and the data delivered from the CPU and the corresponding control and address signals are delivered to the transmission/reception FIFO memory via the bus.

* * * * *